United States Patent
Huber

[11] 3,919,422
[45] Nov. 11, 1975

[54] PROCESS FOR CONTROLLING MICROORGANISMS WITH TETRAHYDRO-1,3-THIAZINIUM SALTS

[75] Inventor: Ludwig Konrad Huber, King of Prussia, Pa.

[73] Assignee: Pennwalt Corporation, Philadelphia, Pa.

[22] Filed: Apr. 17, 1974

[21] Appl. No.: 461,556

Related U.S. Application Data

[62] Division of Ser. No. 220,372, Jan. 24, 1972, Pat. No. 3,821,210.

[52] U.S. Cl. .................................. 424/246; 71/67
[51] Int. Cl.$^2$ .............. C01B 31/81; A01N 11/00
[58] Field of Search ..................... 71/67; 424/246

[56] References Cited
UNITED STATES PATENTS
3,598,590  8/1971  Huckstadt et al. .................... 96/66

OTHER PUBLICATIONS
Cossar et al., Heterocyclic Azonia Derivatives including New Spiro Ring Systems, J. Heterocyclic Chem., 2, pp. 430–440 (1965).

Primary Examiner—James O. Thomas, Jr.
Attorney, Agent, or Firm—David Edwards, Esq.

[57] ABSTRACT

Tetrahydro-1,3-thiazinium salts of the formula

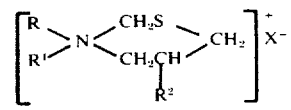

where X is an anion, $R^2$ is hydrogen or hydroxyl, and R and $R^1$ are alkyl, hydroxyl substituted alky, or a heterocyclic ring, are prepared by reacting a secondary amine with formaldehyde and a 3-halopropanethiol. The salts are useful as pesticides and as sensitizers for photographic silver halide emulsions.

4 Claims, No Drawings

PROCESS FOR CONTROLLING MICROORGANISMS WITH TETRAHYDRO-1,3-THIAZINIUM SALTS

This is a division of application Ser. No. 220,372, filed Jan. 24, 1972 and now U.S. Pat. No. 3,821,210.

This invention concerns a novel process for the preparation of a class of tetrahydro-1,3-thiazinium salts and certain new thiazinium salts produced in accordance with said process, and a process of controlling undesirable microorganisms by contact thereof with said salts.

The compounds prepared according to this invention are represented by the formula

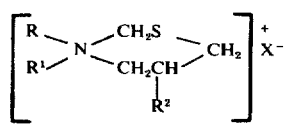

where X is an anion selected from the group consisting of chloride, bromide, iodide, acetate, formate, perchlorate and tosylate, preferably one of the aforesaid halogens, $R^2$ is hydrogen or hydroxyl, and R and $R^1$ are independently alkyl having from 1 to 20 carbon atoms (for example, methyl, ethyl, propyl, isobutyl, hexyl, octyl, isooctyl, dodecyl, octadecyl, etc.), alkyl having from 1 to 20 carbon atoms wherein either or both R and $R^1$ is substituted with one or two hydroxyl groups (for example, 2-hydroxyethyl, 2-hydroxypropyl, 2-hydroxyisooctyl, 2-hydroxyoctadecyl, 3-hydroxypropyl, 6-hydroxyhexyl, 2,2,4-trimethyl-5-hydroxypentyl, 2,3-dihydroxypropyl, etc.), or R and $R^1$ together with the nitrogen atom to which they are attached represent a 5-, 6-, or 7-membered heterocyclic ring (e.g., morpholine, thiomorpholine, piperidine, homopiperidine, homomorpholine, piperazine, etc.). The thiazinium salts wherein either or both of R and $R^1$ is hydroxyl substituted alkyl are novel compounds having unique properties as will be discussed hereinbelow.

According to the process of this invention, a sequential two step reaction is carried out involving reacting a secondary amine with formaldehyde followed by reaction of said admixture with a 3-halopropanethiol to produce the tetrahydro-1,3-thiazinium salt, as depicted below.

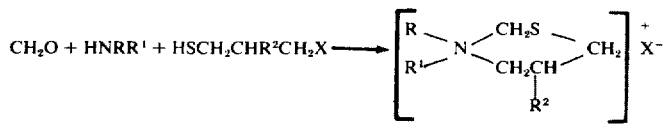

(The X symbol in the foregoing equation denotes chlorine, bromine, or iodine, the halogen moiety of the 3-halopropanethiol reactant; however, the anion moiety of the thiazinium salt product can be converted to give the acetate, formate, perchlorate or tosylate salt by reacting the halide salt product with an appropriate metal salt of the desired anion, such as sodium perchlorate, potassium tosylate, etc.).

Representative secondary amine reactants useful herein to produce the thiazinium salts are, for example, dimethylamine, diethylamine, diisobutylamine, methylbutylamine, diallylamine, dioctylamine, didodecylamine, dioctadecylamine, N-methyloctadecylamine, N-butyloctylamine, N-methylcyclohexylamine, thiomorpholine, piperidine, morpholine, diethanolamine, methylethanolamine, dodecylethanolamine, diisopropanolamine, ethylisopropanolamine, isooctylisopropanolamine, 1-methylamino-2-octanol, 1-butylamino-2-dodecanol, 3-methylamino-1-propanol, 3-butylamino-1,2-propanediol and the like.

The sequence of reactions embodied herein is conveniently carried out in aqueous medium although organic media may be used and combinations of solvents and water, such as ether-water mixtures. The molar ratio of reactants is generally in stoichiometric proportions. Reaction temperatures will normally range from about 0°C. to about 60°C., preferably within the range of about 20° to 40°C., total reaction times varying from about several hours to several days, depending to large degree on the temperature.

The simplicity and the good results attached to the process of this invention are unexpected advantages stemming therefrom in light of the prior art method of preparing certain tetrahydro-1,3-thiazinium compounds, disclosed as useful as sensitizers for photographic silver halide emulsions, described by B. C. Cossar and D. D. Reynolds, "Heterocyclic Azonia Derivatives Including New Spiro Ring Systems", J. Heterocyclic Chem., v. 2, pp 430–440 (1965), involving the sequence of reactions as follows:

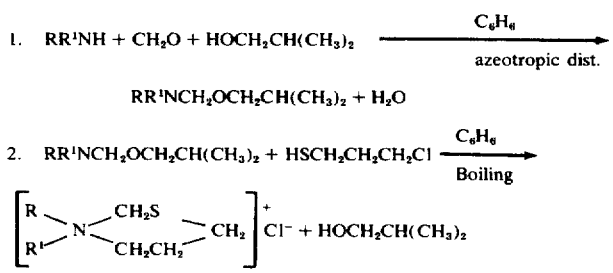

In all of the above-described Cossar and Reynolds compounds, R and $R^1$ are non-reactive lower alkyl, or R and $R^1$ together with the nitrogen atom to which they are attached represent a heterocyclic ring or a spirocyclic bisquaternary salt.

Thus, the method of the present invention, involving the reaction of formaldehyde, secondary amine and halopropanethiol, eliminates the use of the intermediate isobutyloxymethyl amines, $RR^1NCH_2OCH_2CH(CH_3)_2$, as required in the prior art, thus considerably simplifying the method of preparation. Furthermore, due to the mild conditions involved, the novel process embodied herein allows the preparation of novel types of thiazinium derivatives not obtainable in practical yields by the prior art method. Thus, for example, it is now possible to prepare thiazinium salts with reactive hydroxyl groups in the R and R$^1$ moieties in very high conversions employing hydroxyl-containing amine reactants, as previously described. Synthesis of the hydroxyl-containing thiazinium salts embodied herein by the prior art route is not feasible because of various detrimental side reactions that will occur involving the butanol reactant of the first step of the Cossar et al. method. For example, Beilstein 4, III, p. 690 (1962), confirms that the reaction of diethanol amine with aqueous formaldehyde at 50°C. or with paraformaldehyde in butanol, produces 3-(2-hydroxyethyl)oxazoline,

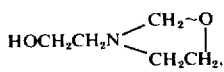

rather than an alkoxy methyldiethanol amine which is the intermediate required for the prior art Cossar et al. route.

In addition to their class utility as sensitizers for photographic silver halide emulsions, the compounds embodied herein have sundry uses in pesticidal applications, the effectiveness of which may vary according to compound structure and the particular environment. For instance, the long-chain thiazinium salts, e.g. where the sum of the number of carbon atoms in R + R$^1$ ranges from about 12–24, are active in inhibiting the growth of and killing a wide spectrum of microorganisms such as bacteria, fungi and algae, including Staphylococcus aureus, Escherichia coli and Chlorella. Other representative bacterium and fungus species against which the compounds may be used are Aspergillus niger, Chaetomium globossum, Ventural inaequalis, Podosphaera leucotricha, Puccinia recondita, Trichophyton interdigitale, Rhizopus stolonifer and Aphanomyces euteiches. Especially useful are the symmetrical thiazinium salts (where R and R$^1$ are the same hydrocarbon groups having from about 6, and preferably 7, to 12 carbon atoms in the chain) which exhibit not only high bacteriostatic and bactericidal activity against gram positive bacteria but also very high bacteriostatic and bacteriocidal activity against the more resistant gram negative bacteria (e.g., Escherichia coli). Thus, the present invention also embodies the method of killing and/or inhibiting the growth of microorganisms (bacteria, fungi and algae) which comprises contacting said organisms with an effective amount of the described thiazinium salt.

The novel, hydroxyl-containing thiazinium salts of this invention have a variety of uses because of the reactivity of the appendant hydroxy groups. For example, reaction of the salt with a halogenated phenylisocyanate produces a compound of high bacteriostatic potency. As another example, the hydroxy-containing methyl(2-hydroxyethyl) derivative (i.e., where R=CH$_3$ and R$^1$=CH$_2$CH$_2$OH) exhibits an unexpected high degree of insecticidal activity compared to the closely related unsubstituted dimethyl derivative (R=CH$_3$ and R$^1$=CH$_3$).

The invention and its uses are clarified and illustrated by the following representative examples.

EXAMPLE 1

Diethanolamine (210 g.) is added drop-wise over a 1.5 hour period to a stirred 36% aqueous formaldehyde solution (167 g.) at a reaction temperature of 26°–28°C. maintained by external cooling. Then, 3-chloropropanethiol (215 g.) is added incrementally over a period of 1.25 hours at 27°–28°C., and the clear homogeneous liquid reaction mixture is held at room temperature for 8 days. Water is stripped from the mixture by vacuum distillation and the pot residue solidifies to a crystalline mass. The material is slurried in acetone, filtered, washed with acetone and dried under high vacuum to yield 330 g. (a yield of 74% based on the diethanolamine) of the off-white solid product 3,3-bis(2-hydroxyethyl) tetrahydro-1,3-thiazinium chloride,

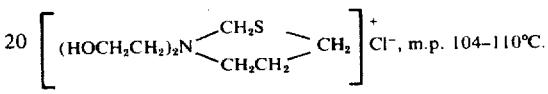

Analysis: Calcd. for C$_8$H$_{18}$ClNO$_2$S: C, 42.19; H, 7.97; S, 14.08%; C, 42.21; H, 8.16; S, 13.92%.

Work-up of the acetone washings produces an additional crop of impure product which brings the overall conversion close to theory.

Reaction of the above-prepared thiazinium salt with two-molar amounts of 3,4-dichlorophenyl isocyanate produces the corresponding di-adduct (m.p. 208°–210°C.), 3,3-bis[2-(3,4-dichlorophenylcarbamyloxy)ethyl]tetrahydro-1,3-thiazinium chloride. In bacteriostatic tests using the Agar Dilution Method, this compound exhibits inhibiting effect against Staphylococcus aureus at concentrations of less than 10 ppm.

EXAMPLE 2

Following the procedure of the previous example, the compound 3,3-dioctyltetrahydro-1,3-thiazinium chloride,

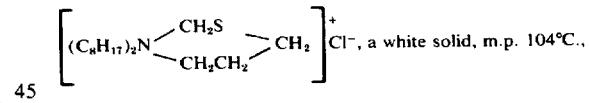

a white solid, m.p. 104°C., is prepared via the reaction di-n-octylamine, formaldehyde and 3-chloropropanethiol.

Analysis: Calcd. for C$_{20}$H$_{42}$ClNS: C, 65.98; H, 11.63; S, 8.81% Found: C, 65.96; H, 11.59; S, 8.98%.

In bacteriostatic tests using the Agar Dilution Method, the compound shows inhibiting effect against Staphylococcus aureus at concentrations as low as 2 ppm, and against Escherichia coli at concentrations as low as 5 ppm.

EXAMPLE 3

Using the procedure of Example 1, di-n-decylamine, formaldehyde and 3-chloropropanethiol are reacted to synthesize 3,3-didecyltetrahydro-1,3-thiazinium chloride, a white solid, m.p. 98°–100°C.

Analysis: Calcd. for C$_{24}$H$_{30}$ClNS: C, 68.60; H, 12.00; S, 7.63%. Found: C, 68.91; H, 12.06; S, 7.72%.

In bactericidal tests using the AOAC Phenol Coefficient Test, the compound demonstrates fast and complete bactericidal action against Staphylococcus aureus at 25 ppm, and against Escherichia coli at 15 ppm.

EXAMPLE 4

Substituting N-methyloctadecylamine for the amine reactant of the previous examples gives the product: 3-methyl-3-octadecyltetrahydro-1,3-thiazinium chloride, a white solid, m.p. 190°C.

Analysis: Calcd. for $C_{23}H_{48}ClNS$: C, 68.01; H, 11.92; $Cl^-$, 8.73%. Found: C, 67.76; H, 11.61; $Cl^-$, 9.01%.

In algistatic tests with Chlorella, a culture treated with 2.5 ppm. of the above compound has a concentration of 630,000 after a growth period of 7 days, versus 2,400,000 for an untreated control.

EXAMPLE 5

Following the procedure of Example 1, methylethanol amine, formaldehyde and 3-chloropropanethiol are reacted to prepare 3-methyl-3-(2-hydroxyethyl)tetrahydro-1,3-thiazinium chloride, m.p. 158°–161°C., Analysis: Calcd. for $C_7H_{16}ClNOS$: C, 42.52; H, 8.10; S 16.22%. Found: C, 42.44; H, 7.87; S 16.38%.

When used as a mosquito larvicide against Aedes aegypti, the compound effects a 70% kill after 48 hours at a test concentration of 10 ppm. In contrast, the closely related unsubstituted 3,3-dimethyl derivative ($R=R^1=CH_3$) is completely inactive under these conditions.

I claim:

1. The method of killing and inhibiting the growth of fungi comprising contacting the fungi with an effective amount of tetrahydro-1,3-thiazinium salt represented by the formula

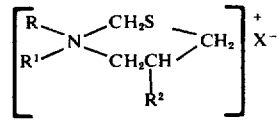

where X is an anion selected from the group consisting of chloride, bromide, iodide, acetate, formate, perchlorate and tosylate, $R^2$ is hydrogen or hydroxyl, and R and $R^1$ are independently alkyl having one to 20 carbon atoms or alkyl having one to 20 carbon atoms substituted with one or two hydroxyl groups, the total of the number of carbon atoms in $R + R^1$ being from about 12 to 24.

2. The method of claim 1 wherein R and $R^1$ are the same moieties.

3. The method of claim 2 wherein each of R and $R^1$ is an alkyl having eight carbon atoms.

4. The method of claim 2 wherein each of R and $R^1$ is an alkyl having 10 carbon atoms.

* * * * *